UNITED STATES PATENT OFFICE.

LEWIS A. INMAN AND ALLEN S. HARRIS, OF DODSON, MONTANA.

FLUX.

1,357,871.     Specification of Letters Patent.     Patented Nov. 2, 1920.

No Drawing.     Application filed July 20, 1920. Serial No. 397,648.

*To all whom it may concern:*

Be it known that we, LEWIS A. INMAN and ALLEN S. HARRIS, citizens of Phillips county, Montana, residing at Dodson, in the county of Phillips and State of Montana, have invented new and useful Improvements in Fluxes, of which the following is a specification.

This invention relates to a composition of matter for use as a flux in soldering and has for its object the provision of a flux which will greatly improve the soldering action, which is non-corrosive and non-poisonous and which will give off no irritating or otherwise objectionable fumes.

A further object is the provision of a flux of this character which may be easily handled as it is not dangerous in any way and all the ingredients of which are simple and inexpensive.

In carrying out our invention we make a flux which is composed of glycerin two parts, zinc sulfate or other zinc salt one part, and salammoniac one part.

We have discovered from experimentation that this flux is well adapted for use in soldering cast iron and is particularly adapted for use in repairing broken water jackets of automobile engines and the like. This flux will not corrode and will therefore assist in forming a permanent and leak-proof joint.

Having thus described our invention, we claim:

1. A soldering flux consisting of glycerin, zinc salt, and salammoniac.
2. A soldering flux consisting of glycerin, zinc sulfate and salammoniac.
3. A soldering flux consisting of glycerin, zinc sulfate, and salammoniac, the glycerin comprising fifty per cent. of the mixture.
4. A soldering flux consisting of glycerin two parts, salammoniac one part, and zinc sulfate one part.

In testimony whereof we affix our signatures.

LEWIS A. INMAN.
ALLEN S. HARRIS.